(12) United States Patent  
Caro et al.

(10) Patent No.: US 6,811,198 B2
(45) Date of Patent: Nov. 2, 2004

(54) SYSTEM FOR STORING A LOAD IN A VEHICLE

(75) Inventors: Hans Jürgen Caro, Wuppertal (DE); Bernd Deissmann, Remscheid (DE); Siggi Fischer, Leverkusen (DE); Dieter Handke, Wermelskirchen (DE); Ralf Hoge, Radevormwald (DE); Christian Schulz, Leichlingen (DE); Frank Müller, Cologne (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/344,882

(22) PCT Filed: Aug. 6, 2001

(86) PCT No.: PCT/EP01/09058
§ 371 (c)(1),
(2), (4) Date: Sep. 2, 2003

(87) PCT Pub. No.: WO02/14107
PCT Pub. Date: Feb. 21, 2002

(65) Prior Publication Data
US 2004/0041424 A1 Mar. 4, 2004

(30) Foreign Application Priority Data
Aug. 16, 2000 (DE) ..................................... 200 14 050 U

(51) Int. Cl.⁷ ................................................. B60N 3/12
(52) U.S. Cl. .................. 296/37.8; 296/37.16; 296/37.5; 296/37.1; 224/542
(58) Field of Search ............................ 296/37.8, 37.16, 296/37.6, 65.09, 69, 183.1, 65.13, 37.5; 224/542, 925, 539, 403, 42.33; 410/121, 129, 94; 29/401.1

(56) References Cited
U.S. PATENT DOCUMENTS

| | | | | |
|---|---|---|---|---|
| 4,226,348 A | * | 10/1980 | Dottor et al. ............... | 224/925 |
| 4,842,175 A | * | 6/1989 | Towsend ................... | 296/37.8 |
| 5,025,964 A | * | 6/1991 | Phirippidis ................. | 296/37.1 |
| 5,469,999 A | * | 11/1995 | Phirippidis .................. | 224/542 |
| 5,626,380 A | * | 5/1997 | Elson et al. ............... | 296/37.1 |
| 5,715,978 A | * | 2/1998 | Ackeret .................... | 224/42.33 |
| 5,979,725 A | * | 11/1999 | Lehrman .................... | 224/925 |
| 6,056,177 A | * | 5/2000 | Schneider .................. | 224/542 |
| 6,247,741 B1 | * | 6/2001 | Seel et al. ............... | 296/37.16 |
| 6,290,277 B1 | * | 9/2001 | Spykerman et al. ........ | 296/37.5 |
| 6,338,518 B1 | * | 1/2002 | D'Annunzio et al. ...... | 296/37.8 |
| 6,375,055 B1 | * | 4/2002 | Spykerman et al. ........ | 224/542 |
| 6,422,567 B1 | * | 7/2002 | Mastrangelo et al. ...... | 296/37.8 |
| 6,502,886 B1 | * | 1/2003 | Bleau et al. ............. | 296/37.16 |
| 6,520,364 B2 | * | 2/2003 | Spykerman et al. ........... | 220/6 |
| 6,644,710 B2 | * | 11/2003 | Seel et al. ............... | 296/37.14 |
| 6,719,347 B2 | * | 4/2004 | Gehring et al. ............ | 296/37.5 |
| 6,733,060 B1 | * | 5/2004 | Pavkov et al. ........... | 296/37.16 |
| 2003/0090120 A1 | * | 5/2003 | Barber et al. .............. | 296/37.5 |

* cited by examiner

Primary Examiner—Kiran Patel
(74) Attorney, Agent, or Firm—Foley & Lardner LLP

(57) ABSTRACT

The present invention concerns a system for storing cargo within a vehicle. The invention is characterized by a support device (2), attached or attachable in the cargo area (4) of the vehicle, for cargo receiving means (6). The support device (2) is pivotable, after the cargo receiving means (6) have been removed and/or collapsed flat, from a utilization position (A) lying on a cargo area floor (8), about a pivot axis (Y) extending in the vicinity of the cargo area floor (8) approximately parallel thereto, into a non-utilization position (B) lying approximately parallel to and in the vicinity of a vehicle partition (10) delimiting the cargo area (4), and thereby uncovering the vehicle floor (8).

12 Claims, 5 Drawing Sheets

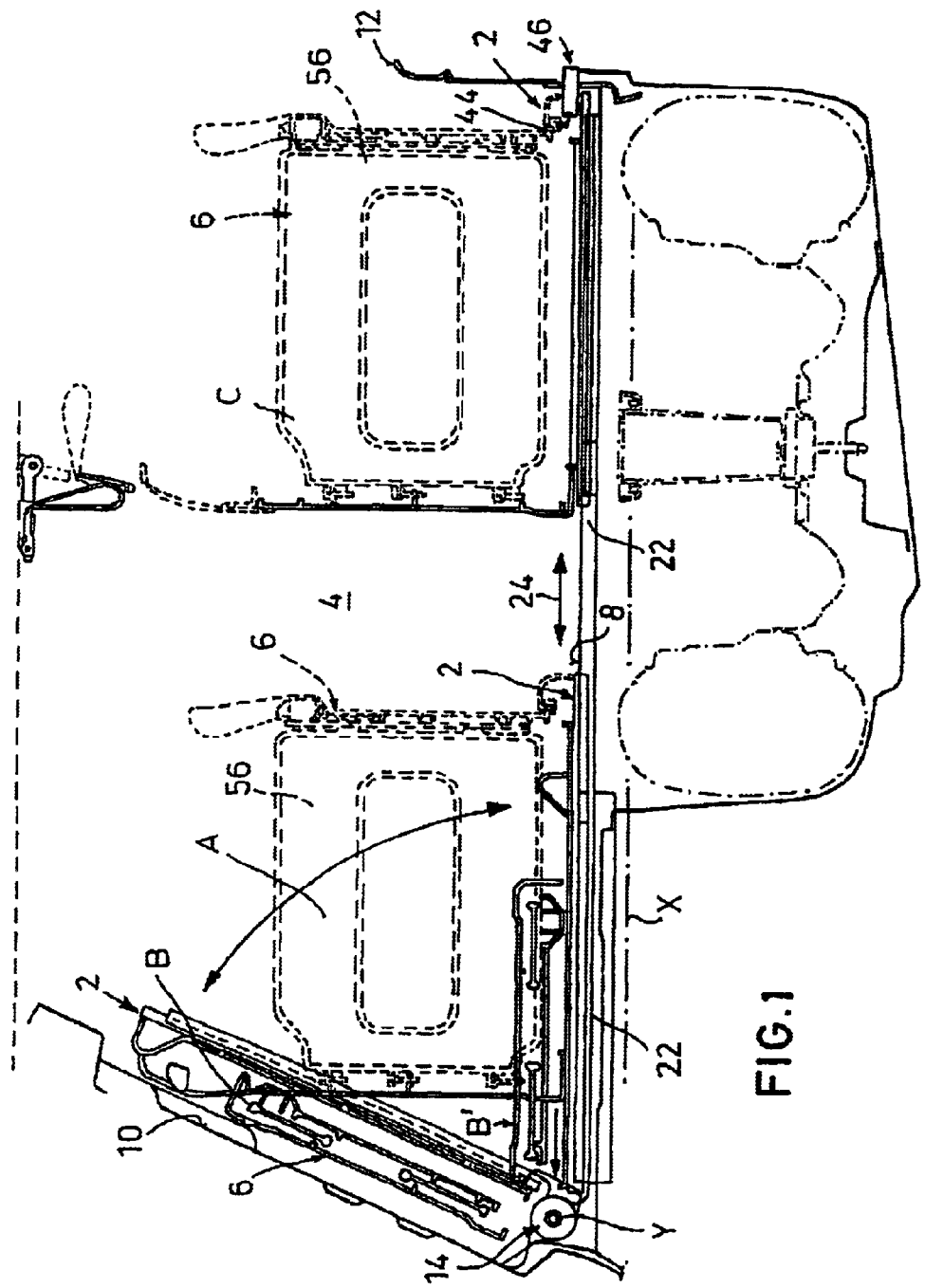

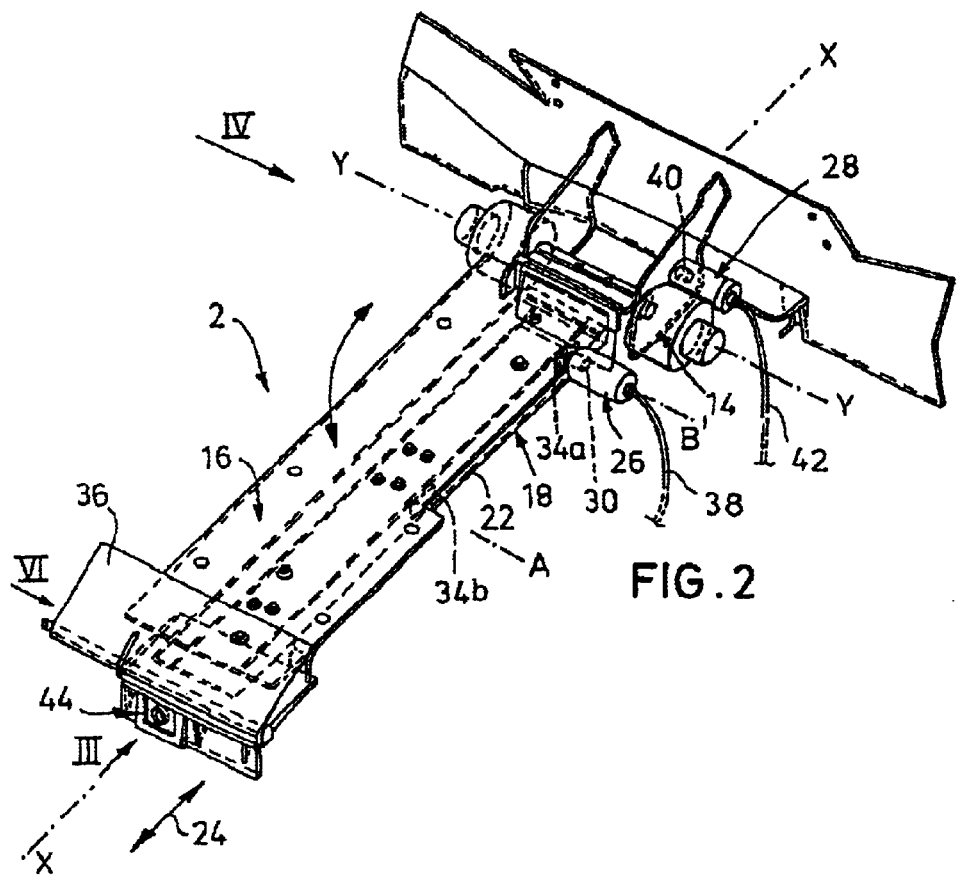
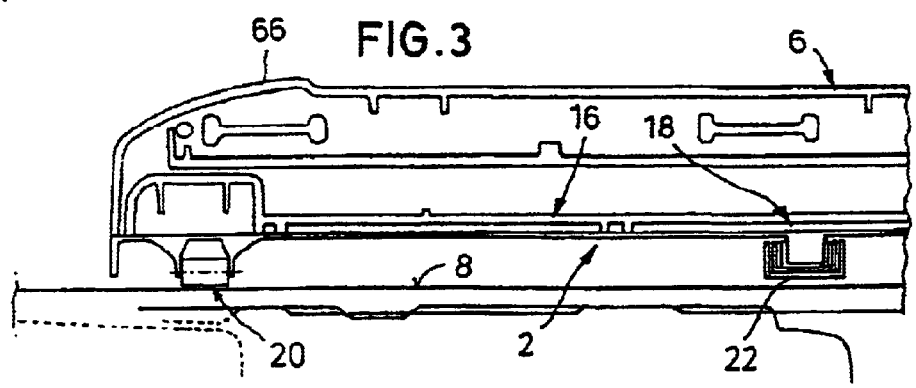

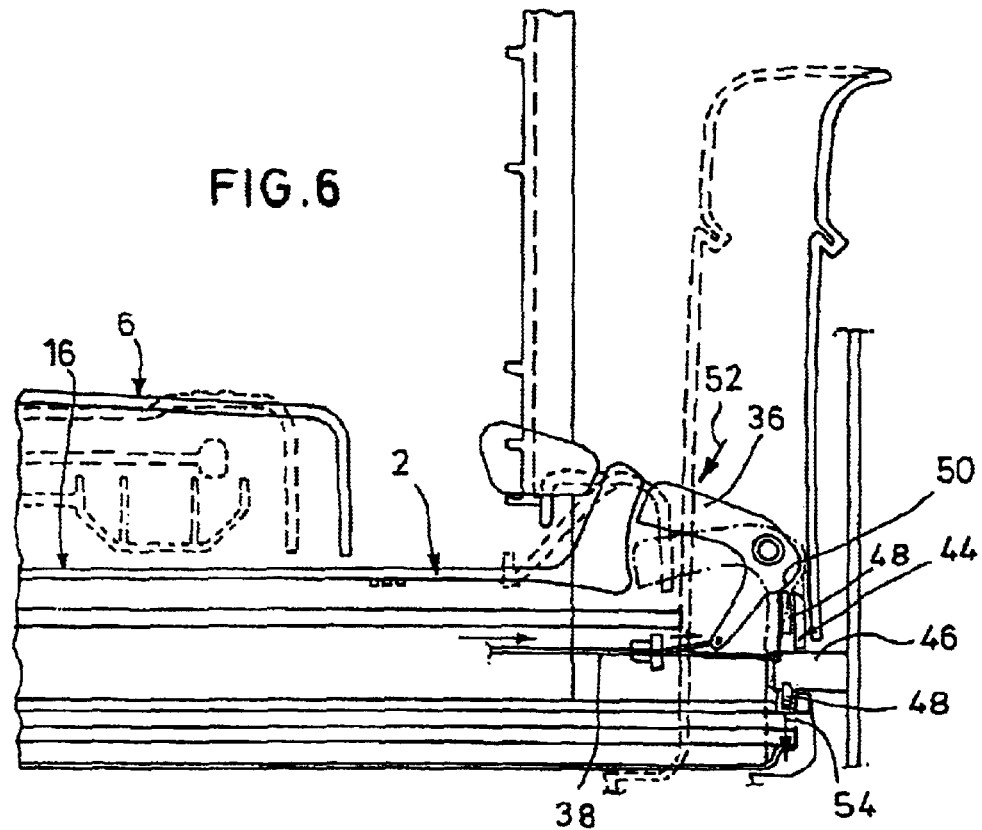
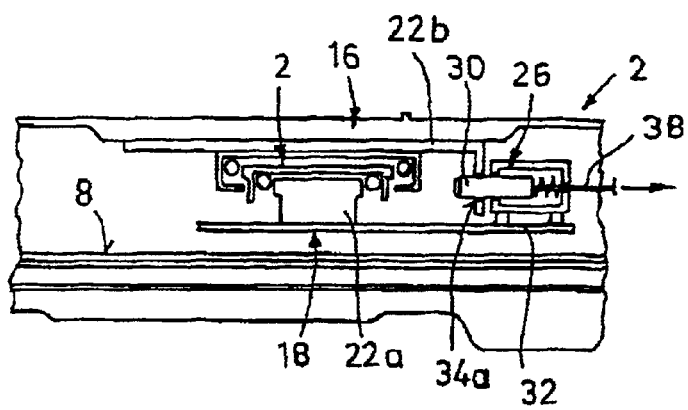

SYSTEM FOR STORING A LOAD IN A VEHICLE

The present invention concerns a system for storing cargo (in a manner secured for travel) within a cargo area of a vehicle.

Such systems are known in a variety of embodiments. For example, a receiving container that can be collapsed flat in the manner of a folding box is attached within a cargo area. In this non-utilization state when collapsed flat, however, a step of greater or lesser height is created with respect to the adjacent cargo area floor because of the unavoidable thickness of the collapsed "package" of container parts; this is very disruptive especially when loading larger objects such as horizontally placed suitcases, since it prevents the particular object from being laid flat on the cargo floor so as not to tip over.

It is the object of the present invention to create a system of the aforesaid kind with which almost any cargo can be stored, always optimally and securely and with a high level of user convenience, in the respective cargo area.

According to the present invention, this is achieved by way of a novel support device, attached or attachable in the cargo area of the vehicle, for cargo receiving means, by the fact that the support device is pivotable (i.e. can be folded up), after the cargo receiving means have been removed and/or collapsed flat, from a utilization position lying on a cargo area floor (in which the cargo receiving means, joined or joinable to the support device, are in a state ready to receive cargo), about a pivot axis extending in the vicinity of the cargo area floor approximately parallel thereto, into a non-utilization position lying approximately parallel to and in the vicinity of a vehicle partition (bulkhead) delimiting the cargo area and thereby uncovering the vehicle floor. The support device is preferably embodied, and is to be arranged inside the cargo area, in such a way that the pivot axis extends transversely, in particular at right angles, to a vehicle longitudinal axis and in the vicinity of a vehicle partition separating the cargo area from a passenger compartment and located opposite a cargo area opening. In the case of a rear cargo area, the vehicle partition is therefore at the front in the direction of travel and as a rule extends obliquely upward, tilted toward the cargo area opening.

The system according to the present invention makes possible extraordinarily variable and convenient use of the cargo area. Certain cargo, for example of smaller size, can be stored by using the cargo receiving means, in particular in the form of a folding-box-like receiving container, with the support device in the utilization position. Storage, i.e. loading, can advantageously be facilitated in this context if the support device is embodied in such a way that the cargo receiving means are movable out of the utilization position (in which they are located, in a state ready to receive the respective load, as close as possible to the vehicle partition delimiting the cargo area) away from the vehicle partition toward the cargo area opening into a loading position. The arrangement, which can then be loaded very easily and conveniently, can then be brought back into the utilization position close to the vehicle partition located opposite, so that the space between the receiving means (e.g. containers) retained and guided by way of the support device according to the present invention and the cargo area opening can then additionally be used for further cargo, e.g. vertically placed bags, beverage crates, etc. For flat loading of larger items, for example horizontally placed suitcases, the entire support device can advantageously—either after removal of the actual cargo receiving means or preferably, with the receiving means in a collapsed-flat state, together therewith—be pivoted upward about the pivot axis against the vehicle partition delimiting the cargo area, thereby consequently completely uncovering almost the entire cargo area floor, with no essential system parts being left behind on the floor. Only a small space directly adjacent to the vehicle partition delimiting the cargo area is necessary for accommodation of the system parts according to the present invention. Experience indicates, however, that it is precisely this space that is in any event the least-used region of the cargo area (principally because of the aforementioned oblique extension of the vehicle bulkhead), so that the invention entails practically no limitation on cargo area use, but instead results in better utilization of the cargo area.

The support device according to the present invention constitutes practically a universally usable "platform" for mounting almost any cargo receiving means. In addition, the support device can also be used universally in different vehicles; all that is needed for that purpose are particular adapter parts for attachment, in a manner adapted to the specific vehicle, of the support device and optionally of further associated functional parts, within the cargo area of the particular vehicle.

Further advantageous features of the invention are contained in the dependent claims and in the description below.

The invention will be explained in more detail below by way of example and with reference to the drawings, in which:

FIG. 1 is a schematic side view in the region of a vehicle cargo area having the system according to the present invention, simultaneously depicting a variety of use positions;

FIG. 2 is a perspective depiction of the support device according to the present invention;

FIG. 3 is a partial front view (arrow direction III according to FIG. 2, although certain parts have been omitted);

FIG. 6 is a schematic "transparent" side view in arrow direction VI according to FIG. 2;

FIG. 7 is a section in plane VII—VII according to FIGS. 4 and 5; and

In the various Figures of the drawings, identical parts are always labeled with identical reference characters and therefore, as a rule, also need to be described only once.

Figure 8:
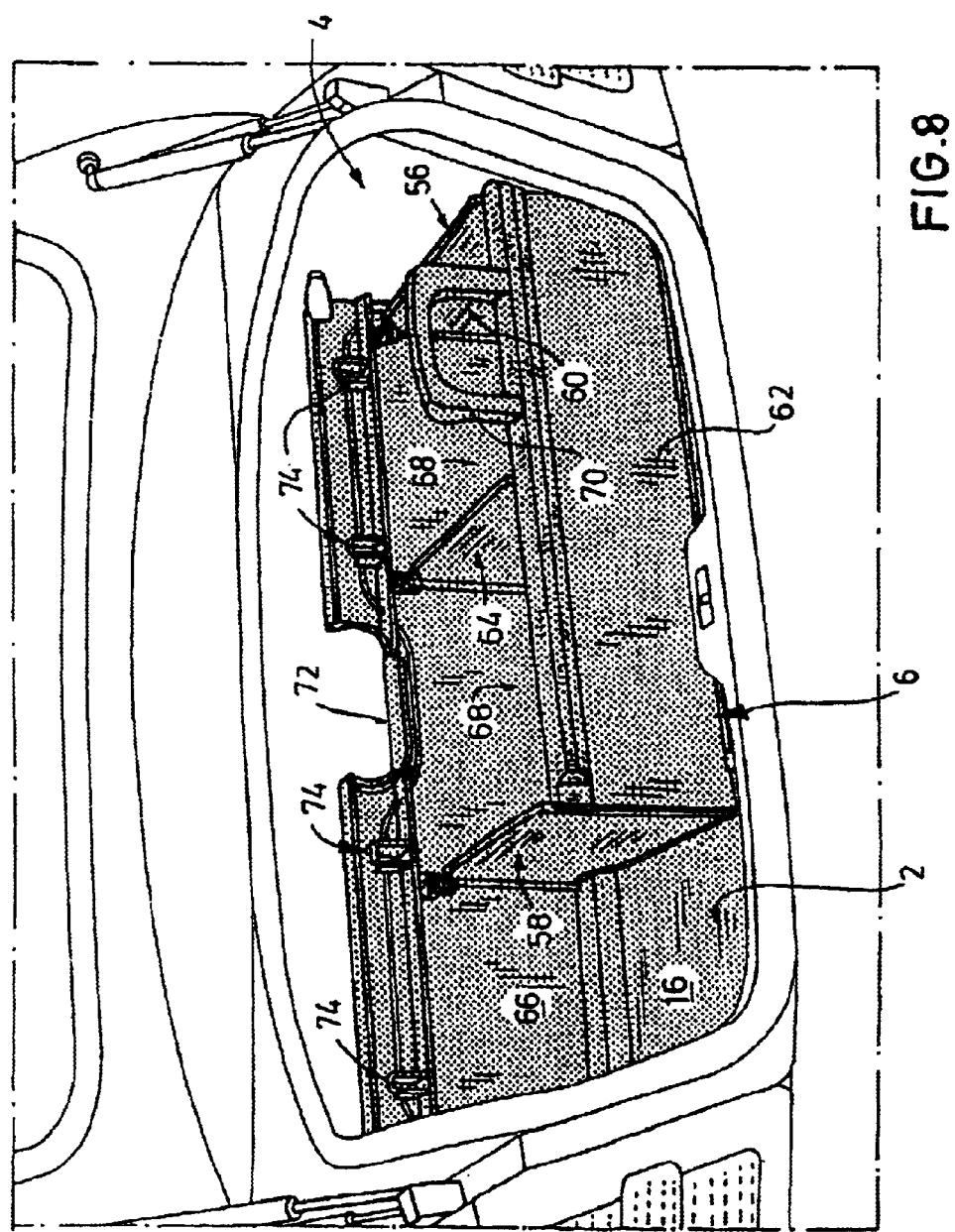
FIG. 8 is a perspective view into a vehicle cargo area having a system according to the present invention in a loading position.

The system according to the present invention comprises a support device 2 as the essential system assembly. This support device 2 is on the one hand attachable in a cargo area 4 (cf. esp. FIGS. 1 and 8) of a vehicle. On the other hand, cargo receiving means 6 can be attached to support device 2. Support device 6 [sic] thus provides adjustable mounting of receiving means 6 within cargo area 4. For that purpose, according to the present invention, support device 2 is pivotable—after cargo receiving means 6 has been removed and/or collapsed flat—from a utilization position (labeled A in FIG. 1) lying approximately parallel to a cargo area floor 8, about a pivot axis Y extending in the vicinity of cargo area floor 8 approximately parallel thereto, into a non-utilization position B in which support device 2 lies practically completely, and optionally together with receiving means 6 that have been placed flat, approximately parallel to and in the vicinity of vehicle partition (bulkhead) 10 delimiting cargo area 4. As a result, practically the entire cargo area floor 8 is uncovered.

Pivot axis Y preferably extends at right angles to a vehicle longitudinal axis X, in which context vehicle partition 10 separates cargo area 4 from a passenger area, and is thus located opposite a cargo area opening 12 (cf. esp. FIG. 1). Since cargo area 4 is, in most current vehicles, provided in the rear region, vehicle partition 10 is thus a front boundary of cargo area 4 facing in the direction of travel.

As is also evident from FIG. 1, in a further advantageous embodiment of the invention provision is made for cargo receiving means 6 to be movable, by way of support device 2 according to the present invention, out of utilization position A and also away from vehicle partition 10 toward cargo area 12, into a loading position C.

As is further evident in particular from FIGS. 2 through 5, support device 2 comprises substantially a pivot joint 14 attachable in cargo area 4, as well as retention means 16 for, in particular, releasable attachment to cargo receiving means 6. Retention means 16 are joined to pivot joint 14 via a sliding guide 18. Retention means 16 can preferably be embodied in the form of a baseplate. Retention means 16 have, on their underside, support rollers 20 for displaceable or rolling support on cargo area floor 8 (cf. FIG. 3). Preferably at least four support rollers 20 are arranged in the respective corner regions of the underside of baseplate used as retention means 16.

Figure 4:
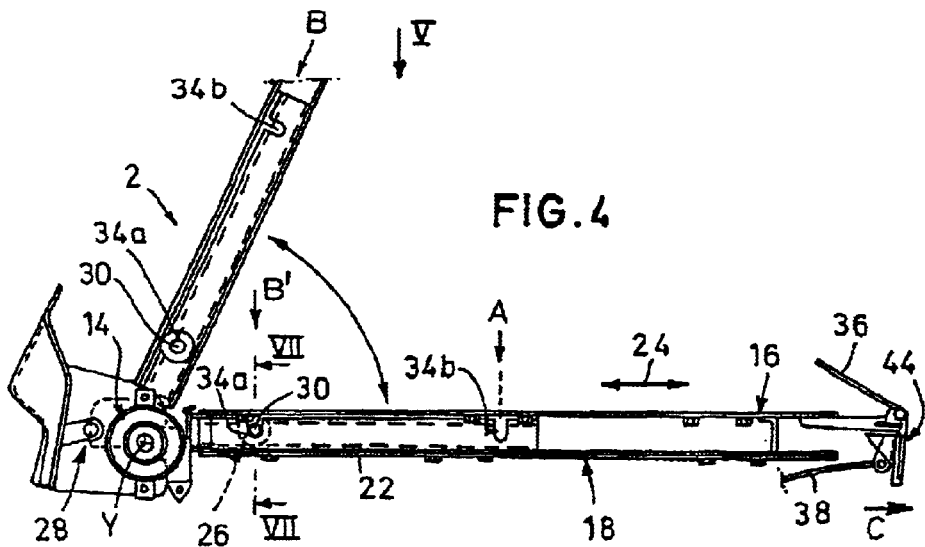
FIG. 4 is a side view of the support view in arrow direction IV according to FIG. 2, depicting two different pivot positions.
Figure 5:
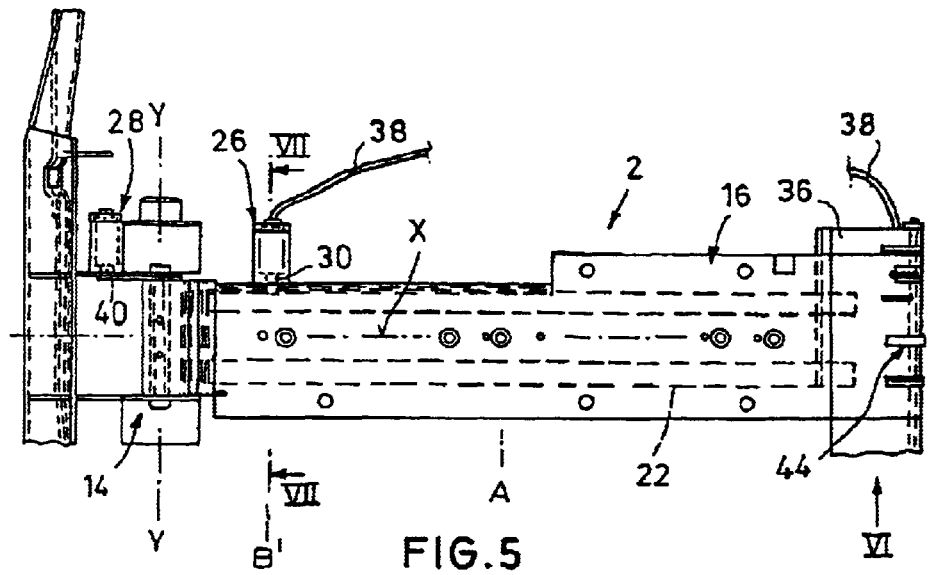
FIG. 5 is a plan view in arrow direction V according to FIG. 4.

As shown in FIGS. 3 and 4, sliding guide 18 comprises at least one, in the example depicted exactly one, centeredly arranged telescopic rail guide 22. Telescopic rail guides of this kind are used in a similar embodiment, for example, as drawer guides in the furniture industry. Telescopic rail guide 22 thus comprises rail elements, engaging telescopically into one another, that permit a movement of retention means 16, and of receiving means 6 joined thereto, in the direction of motion axis X. This is indicated in each of FIGS. 1, 2, and 4 by a double arrow 24.

As an alternative to the preferred embodiment depicted, sliding guide 18 can also be constituted by other means, for example a scissor-lever linkage.

According to the present invention, locking means are additionally provided for releasable locking of support device 2 in each of its possible positions A, B, and C. These involve on the one hand a rail locking system 26 with which, in the region of telescopic rail guide 22, the system is selectably lockable in utilization position A or in a relative position B' for pivoting into non-utilization position B. On the other hand, there is provided in the region of pivot joint 14 a pivot locking system 28 with which support device 2 can be locked in the folded-up non-utilization position B (cf. esp. FIG. 4).

As is evident from FIG. 2 and FIGS. 4 through 7, rail locking system 26 has a bolt element 30 (FIG. 7) that is attached by way of retention means 32 on one (22*a*) of the rail elements engaging telescopically into one another, and in each of the two positions A or B' engages, preferably by spring force, into a bolt opening 34*a* (position B') or 34*b* (position A) transversely to motion direction X (cf. also FIG. 4). To release this rail locking system 26, there is arranged at the free end of rail guide 18, opposite pivot joint 14, a release button 36 that acts via a motion transfer element, preferably a Bowden cable 38, on bolt element 30 in order to move it against the spring force out of the respective bolt opening 34*a* or 34*b* and thus allow rail guide 18 to be adjusted.

Pivot locking system 28 also has a bolt element 40 (FIGS. 2 and 5), which in the example depicted acts parallel to pivot axis Y. A radially acting embodiment (perpendicular to pivot axis Y) is also possible, however. Bolt element 40 is preferably releasable by means of a separate hand lever; this hand lever (not depicted in the drawings) can be arranged at an easily accessible point, in particular in the opening region of cargo area 4. Here again, actuation is preferably accomplished via a Bowden cable 42 (FIG. 2). It is particularly advantageous in this context to arrange and design the hand lever in such a way that it simultaneously also performs a visual indication function for proper locking of pivot locking system 28. If the locked position (position B) is not completely reached in the folding-up operation, bolt element 40 does not snap completely into place. The hand lever then remains in a certain position which indicates to the user that locking has not yet been achieved. Only when bolt element 40 element snaps into place does the hand lever move into a position that indicates locking.

In a further advantageous embodiment of the invention, an end locking system 44 is provided (cf. esp. FIG. 6); it is arranged at the free end of telescopic rail guide 22 in the region of release button 36, and coacts with a bolt element 46, mounted immovably in cargo area 4, in order to lock telescopic rail guide 22 in loading position C. This locking acts on the one hand in the direction of travel of vehicle longitudinal axis X, and on the other hand, advantageously, also in the direction of transverse axis Y, thereby achieving a high level of driving safety by properly securing the cargo. A bolt slider 48 into which bolt element 46 engages (cf. FIG. 6) is guided, for example vertically, in the end region of telescopic rail guide 22. Preferably, bolt slider 48 can also be actuated by way of release button 36 in order to release this end locking system 44. Consequently, in this preferred embodiment, release button 36 advantageously has a dual function: it serves to unlock end locking system 44 and also to unlock rail locking system 26. Actuation of bolt slider 48 is accomplished via an eccentric cam segment 50 of release button 36. As a result, when release button 36 is actuated by being pushed in arrow direction 52, bolt slider 48 is moved in arrow direction 54 (against the force of a return spring) in order to disengage bolt element 46.

In the context of pivot locking system 28, it is additionally advantageous if a damping apparatus (not depicted) is provided in such a way that after the unlocking of pivot locking system 28, support device 2 pivots downward out of its upwardly pivoted, locked non-utilization position B toward cargo area floor 8 in response to gravity but in slow, braked fashion. It is advantageous if in the lower position, a small vertical distance still remains as a gripping space to be reached under for displacement in the direction of loading position C. This small vertical distance is then closed up when cargo receiving means 6 is loaded.

It is additionally useful, for fast and preferably tool-free and releasable attachment of cargo receiving means 6 to retention means 16 of support device 2, to provide suitable quick-release coupling means. These are not described further hereinafter.

In the exemplary embodiment depicted, cargo receiving means 6 are embodied as a receiving container 56, similar to a folding box, that is made up of container parts that can be collapsed flat. According to FIG. 8, which shows receiving container 56 set up and ready for reception with support device 2 in loading position C, receiving container 56 comprises partition parts 58, 60, 62, and 64 joined foldably to one another, and a cover part 66 which, in the set-up position shown in FIG. 8, also constitutes a partition part. Cover part 66 is joined in articulated fashion, by way of two lateral partition parts 58 and 60, to front partition part 62 in such a way that by means of a parallelogram-like folding-up motion, the partition parts can be conveyed from their position lying flat on top of one another and on the inner side of cover part 66 into a state that forms at least one receiving compartment 68 (and vice versa). In the collapsed position, a kind of case is therefore formed by the fact that in the closed non-utilization state, the respective partition parts are covered by cover part 66 (cf. also FIG. 3). Divided receiving compartments 68 can be formed by way of at least one separating partition 64. Also provided is a handle 70 that preferably is attached to front partition part 62 in such a way that in the non-utilization state, it is located in the region of a correspondingly configured recess 72 of cover part 66. This advantageous configuration makes possible one-hand operation in convenient fashion, since handle 70 can be used not only to lift up cover part 66 but also for the parallelogram-like lifting motion of the partition parts.

Several hook elements 74 are preferably also arranged, in particular, on the inner side of cover part 66, so that objects, for example grocery bags, can also be secured by suspension.

As a variant of the preferred embodiment, any other types of cargo receiving means 6 can also be provided, for example mounts for beverage crates or retention devices adapted for other objects.

Support device 2 according to the present invention constitutes a kind of "platform system" because it can be designed for adjustable attachment of different kinds of cargo receiving means 6 within cargo areas 4 of practically any vehicle. All that need be provided for that purpose are respective specific adapter parts for attachment, in a fashion adapted to a specific vehicle, of support device 2 and its additional associated functional parts (in particular bolt element 46) within the particular vehicle. Retention means 16 also need to be adapted to the particular cargo receiving means 6 that will be used.

The invention is not limited to the exemplary embodiments depicted and described, but also encompasses all embodiments of identical function as defined by the invention. In addition, the invention is also so far not yet confined to the combination of features defined in Claim 1, but rather can also be defined by any other combination of specific features of all of the totality of the disclosed individual features. This means that essentially practically any individual feature of Claim 1 can be omitted or replaced by at least one individual feature disclosed elsewhere in the Application. Claim 1 is thus to be understood only as a first attempt at stating an invention.

What is claimed is:

1. A system for storing cargo within a vehicle, comprising a support device attached or attachable in the cargo area of the vehicle, for cargo receiving means the support device being pivotable, after the cargo receiving means have been removed and/or collapsed flat, from a utilization position lying on a cargo area floor about a pivot axis extending in the vicinity of the cargo area floor approximately parallel thereto, into a non-utilization position lying approximately parallel to and in the vicinity of a vehicle partition delimiting the cargo area and thereby uncovering the vehicle floor.

2. The system as defined in claim 1, wherein the support device is embodied, and is to be arranged inside the cargo area in such a way that the pivot axis extends transversely to a vehicle longitudinal axis and in the vicinity of a vehicle partition separating the cargo area from a passenger compartment and located opposite a cargo area opening.

3. The system as defined in claim 1, wherein the support device is embodied in such a way that the cargo receiving means are movable out of the utilization position—in which they are located, in a state ready to receive a load, close to the vehicle partition—away from the vehicle partition toward the cargo area opening into a loading position.

4. The system as defined in claim 1, wherein the support device has a pivot joint attachable in the cargo area, as well as retention means for, in particular, releasable attachment to the cargo receiving means the retention means being joined to the pivot joint via a sliding guide.

5. The system as defined in claim 4, wherein the retention means preferably embodied in the form of a baseplate, have support rollers for displaceable support on the cargo area floor.

6. The system as defined in claim 4, wherein the sliding guide comprises at least one telescopic rail guide.

7. The system as defined in claim 4, wherein the sliding guide is constituted by a scissor-lever linkage.

8. The system as defined in claim 1, comprising a locking means for releasable locking of the support device in preferably each of its possible positions.

9. The system as defined in claim 1, comprising a damper apparatus such that after the unlocking of associated locking means the support device pivots downward out of its upwardly pivoted, locked non-utilization position toward the cargo area floor in response to gravity but in a slow, braked fashion.

10. The system as defined in claim 1, comprising a quick-release coupling means for releasable attachment of the cargo receiving means to the support device.

11. The system as defined in claim 1, wherein the cargo receiving means are embodied as a receiving container, similar to a folding box, that is made up of container parts that can be collapsed flat.

12. The system as defined in claim 1, comprising adapter parts for attachment, in a manner adapted to the specific vehicle, of the support device and further associated functional parts within the cargo area of the particular vehicle.

* * * * *